(12) United States Patent
Maine, Jr. et al.

(10) Patent No.: US 9,994,396 B1
(45) Date of Patent: Jun. 12, 2018

(54) LANE DIVIDER FOR EYE LINK CONVEYOR BELT

(71) Applicant: CAMBRIDGE INTERNATIONAL, INC., Cambridge, MD (US)

(72) Inventors: Robert E. Maine, Jr., Salisbury, MD (US); George H. Messick, Jr., Cambridge, MD (US); Thomas O. Perdue, Salisbury, MD (US); Jeffery D. Ulchak, Salisbury, MD (US); Charles E. Hennigar, Cambridge, MD (US)

(73) Assignee: CAMBRIDGE INTERNATIONAL, INC., Cambridge, MD (US)

( * ) Notice: Subject to any disclaimer, the term of this patent is extended or adjusted under 35 U.S.C. 154(b) by 0 days. days.

(21) Appl. No.: 15/375,648

(22) Filed: Dec. 12, 2016

Related U.S. Application Data

(60) Provisional application No. 62/266,062, filed on Dec. 11, 2015.

(51) Int. Cl.
*B65G 17/42* (2006.01)
*B65G 17/06* (2006.01)
(Continued)

(52) U.S. Cl.
CPC ............ *B65G 17/064* (2013.01); *B65G 15/54* (2013.01); *B65G 17/083* (2013.01); *B65G 17/30* (2013.01); *B65G 17/42* (2013.01)

(58) Field of Classification Search
CPC ....... B65G 15/54; B65G 17/42; B65G 17/064
See application file for complete search history.

(56) References Cited

U.S. PATENT DOCUMENTS

| 3,055,488 A * | 9/1962 | Stone ..................... | B65G 15/48 |
| | | | 198/699.1 |
| 3,580,388 A * | 5/1971 | Resener ................. | B65G 15/42 |
| | | | 198/690.2 |

(Continued)

FOREIGN PATENT DOCUMENTS

| FR | 2611678 A1 * | 9/1988 | ........... B65G 17/064 |
| FR | 2611678 A1 | 9/1988 | |

(Continued)

OTHER PUBLICATIONS

Extended European Search Report dated Apr. 21, 2017 in counterpart European Application No. 16 20 3207 (11 pages In English).

(Continued)

*Primary Examiner* — Thomas Randazzo
(74) *Attorney, Agent, or Firm* — Buchanan Ingersoll & Rooney PC (57) ABSTRACT

An eye link conveyor belt including a plurality of eyelets and a plurality of cross rods, the plurality of eyelets including openings on each end and the plurality of cross rods extending through the openings to thereby connect the plurality of eyelets together; and a plurality of wire forms connected to the conveyor belt, the wire forms including at least one protrusion extending above a planar product support surface of the conveyor belt. A plurality of side plates can be secured to the conveyor belt by the wire forms and also extend above the planar product support surface of the conveyor belt.

13 Claims, 7 Drawing Sheets

(51) Int. Cl.
*B65G 17/30* (2006.01)
*B65G 17/08* (2006.01)
*B65G 15/54* (2006.01)

(56) References Cited

U.S. PATENT DOCUMENTS

| | | | |
|---|---|---|---|
| 5,957,268 A * | 9/1999 | Meulenkamp | B65G 17/064 198/850 |
| 6,471,041 B1 | 10/2002 | Long et al. | |
| 7,658,277 B2 * | 2/2010 | Meulenkamp | B65G 17/065 198/848 |
| 9,555,970 B2 * | 1/2017 | Franzoni | B65G 15/48 |
| 2006/0163039 A1 * | 7/2006 | Marshall | B65G 15/54 198/778 |
| 2017/0129708 A1 * | 5/2017 | Maine, Jr. | B65G 15/48 |

FOREIGN PATENT DOCUMENTS

| | | | | |
|---|---|---|---|---|
| FR | 2611678 A1 * | 9/1998 | | B65G 17/064 |
| FR | 2815330 A1 | 4/2002 | | |
| NL | 1005979 C2 | 11/1998 | | |

OTHER PUBLICATIONS

Anonymous: "Wire Belt: Products, Specialty Conveyor Belts", Jul. 20, 2015 (Jul. 20, 2015), XP055364091, Wire Belt Company Limited, Retrieved from the Internet: URL:http://www.wirebelt. com/products/products-belts/specialty-belts [retrieved on Apr. 12, 2017].

* cited by examiner

LANE DIVIDER FOR EYE LINK CONVEYOR BELT

TECHNICAL FIELD

The disclosure herein is directed to a lane divider for a conveyor belt, in particular an eye link style conveyor belt, and more particularly to a weldless lane divider for an eye link style conveyor belt.

BACKGROUND

Eye link style conveyor belts have been in existence for some time and are a popular style of belting in Europe. The eye link conveyor belt is constructed of small eyelets which may be welded onto a cross wire to form segments, generally 4-12 inches in width, which are then cut-down as needed and brick-laid assembled with other components such as reinforcing/support bars (bar links) to form a row of segments and components which are then linked to adjacent rows with hinge point connecting rods (cross rods).

These belts have the advantage of an extremely stable top surface and they are durable. They are very open, cleanable and drainable which are good for airflow and food processing. They also have excellent transfer characteristics for top heavy or delicate products. This makes them useful in pasteurizing, drying, frying, cooling, freezing and baking.

It is not always desirable, however, to have a smooth, unobstructed conveying surface. Welded dividers have been used heretofore to divide the surface into multiple lanes for product and thereby limit movement thereof, but welding the individual dividers is a time and labor intensive job. Other lane dividers provided as additional components also add material costs and require additional assembly labor since they are not integral to the belt construction.

Accordingly, there exists a need in the marketplace for an eye link conveyor belt that has the advantages of the prior art but which also allows varying surface/engineering characteristics of the conveyor surface without welding.

SUMMARY

The disclosure herein provides an eye link conveyor belt comprising a plurality of eyelets and a plurality of cross rods, said plurality of eyelets including openings on each end and said plurality of cross rods extending through the openings to thereby connect the plurality of eyelets together; and a plurality of wire forms connected to the conveyor belt, the wire forms including at least one protrusion extending above a planar product support surface of the conveyor belt.

A further aspect of the disclosure is directed to an eye link conveyor belt comprising a plurality of side plates secured to the conveyor belt by the wire forms and extending above the planar product support surface of the conveyor belt.

BRIEF DESCRIPTION OF THE DRAWING FIGURES

These and other features and advantages of the disclosure will become more readily apparent to those skilled in the art upon reading the following detailed description, in conjunction with the appended drawings in which.

DETAILED DESCRIPTION OF THE PREFERRED EMBODIMENTS

Figure 1:
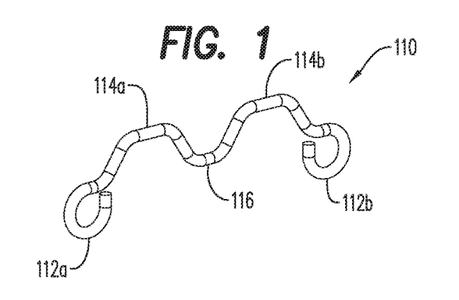
FIG. 1 is a perspective view of a wire form or lane divider according to an exemplary embodiment of the disclosure.
Figure 2:
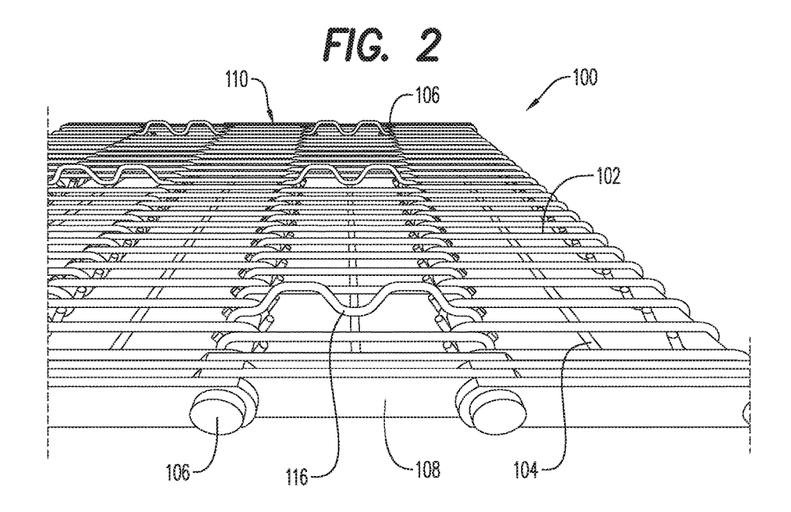
FIG. 2 is perspective view of an eye link style conveyor belt with lane dividers according to an exemplary embodiment of the disclosure.

An eye link style conveyor belt in accordance with an exemplary embodiment of the disclosure is shown generally in FIGS. 1-2 by reference numeral 100. Conveyor belt 100 preferably comprises a plurality of eyelets 102 which are formed from a metal wire and positioned with a fixed spacing or first count along a cross wire 104 by welding or the like in the width direction of the belt. The eyelets 102 are joined together with cross rods 106 passing through the openings on opposing ends of eyelets 102. One or more bar links 108 may be fixed on at least one end by welding or the like. Bar links 108 provide the tension carrying capacity for the belt 100. Conveyor belt 100 can also be formed of course without the cross wires 104, in which case the cross rods 106 connect the eyelets 102 to form the conveyor belt.

In an exemplary embodiment of the disclosure, the surface characteristics of conveyor belt 100 can also be varied. That is, lane dividers or wire forms 110 can be provided for retaining product lanes or creating rough surface characteristics to reduce product movement. The lane dividers 110 extend above the planar product support surface of the conveyor belt to thereby restrict product movement. Similar to eyelets 102, the lane dividers 110 also include openings 112a, 112b on each end that allow cross rods 106 to pass therethrough. In addition, lane dividers 110 include protrusions 114a, 114b extending above the planar product support surface of the conveyor belt and a depression 116 disposed therebetween which is welded to the cross wire 104.

These same wire forms 110 can be used for mounting flights for inclines, or for transfer combs for fragile or top heavy products. Thus, when additional product retainage is required, the wire forms 110 can also serve to secure side plates 118 to the conveyor belt 100, as shown in FIGS. 3-7, without the use of welds. The side plate 118 is formed of a sheet metal or wire cloth according to a preferred embodiment of the disclosure. Further, the surface of the side plate may have dimples or a raised surface for ease of product release, or the surface may include openings, holes, or slots to allow fluids to pass therethrough while still retaining the product within the desired position.

Figure 3:
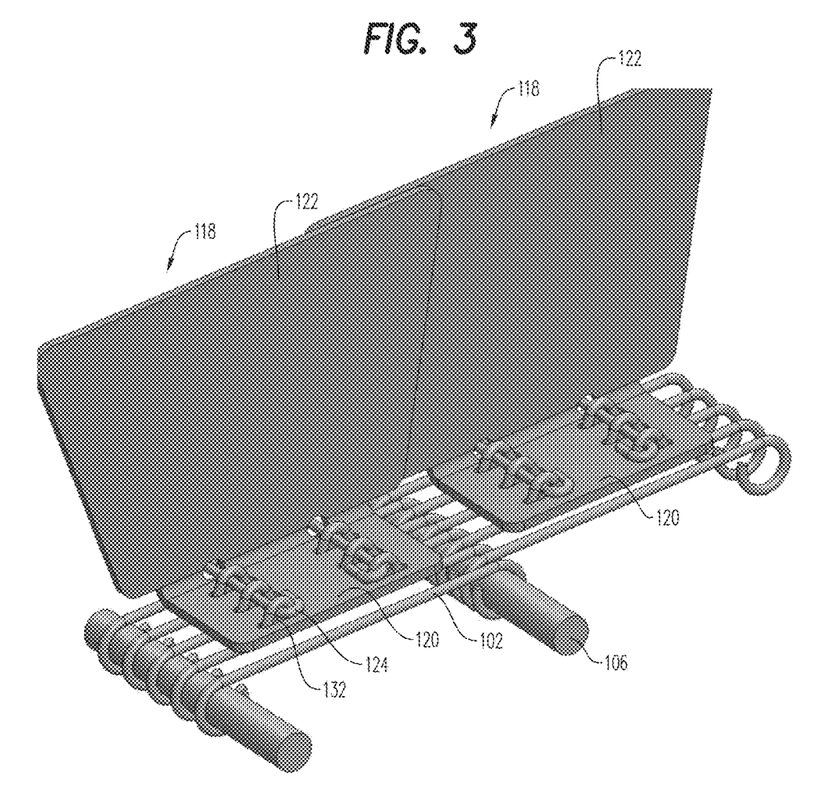
FIG. 3 is a front perspective view of adjacent weldless side plates according to an exemplary embodiment of the disclosure.
Figure 4:
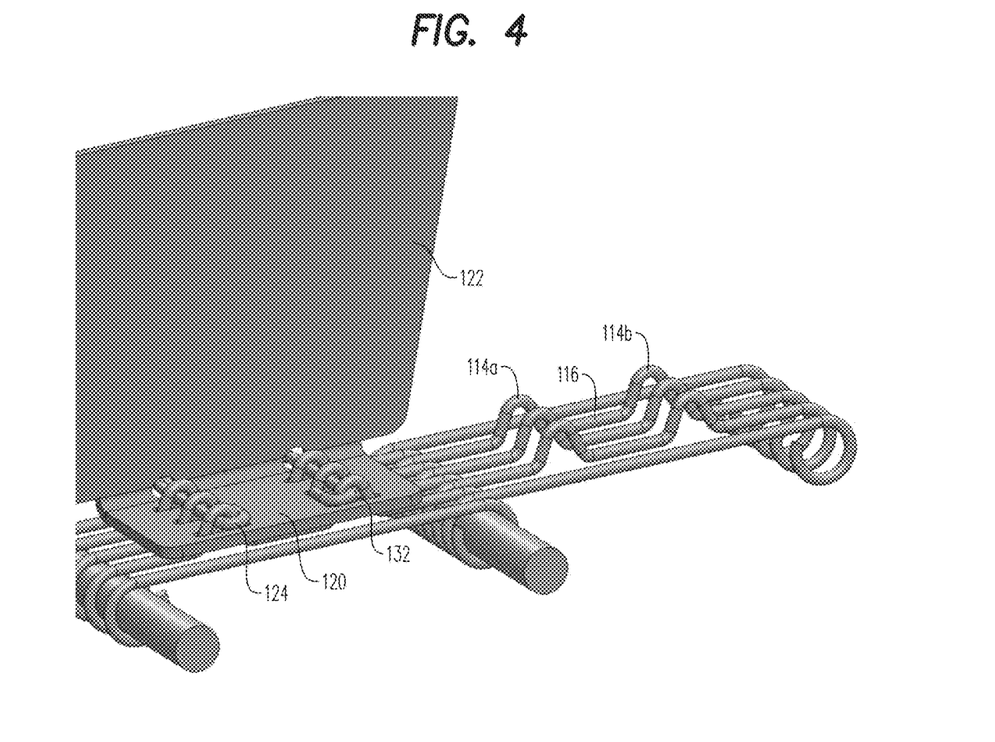
FIG. 4 is front perspective view of a weldless side plate according to an exemplary embodiment of the disclosure.
Figure 5:
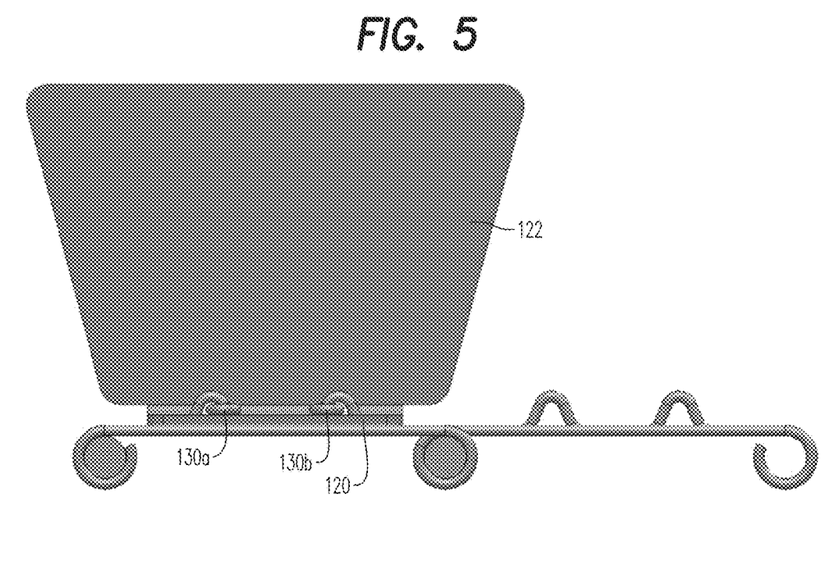
FIG. 5 is a front elevational view of the weldless side plate shown in FIG. 4.
Figure 6:
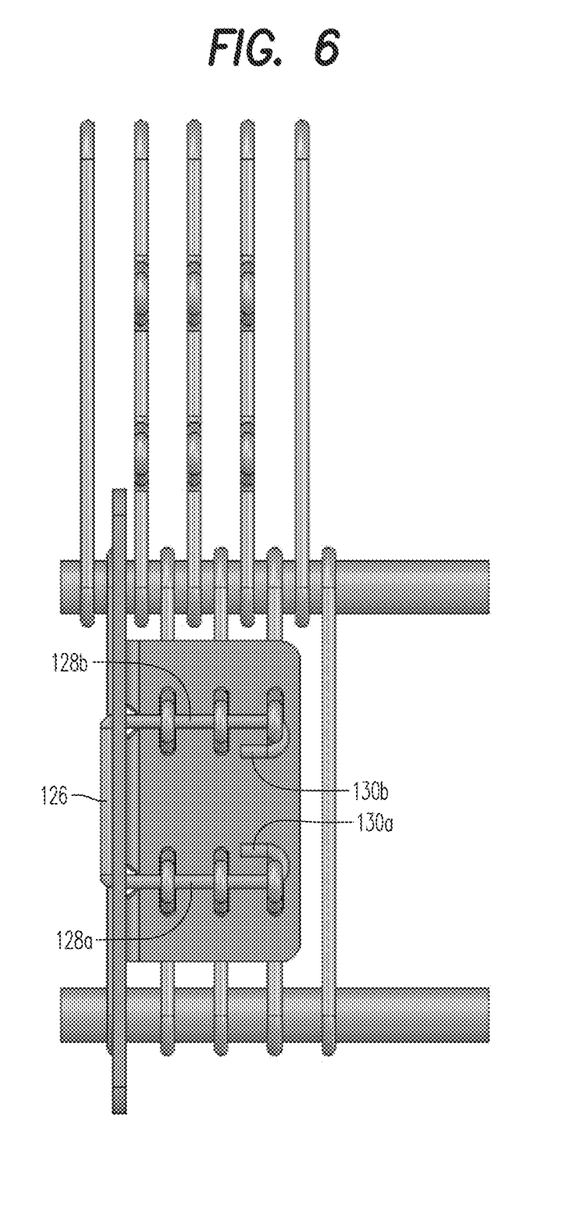
FIG. 6 is a top plan view of the weldless side plate shown in FIG. 4.
Figure 7:
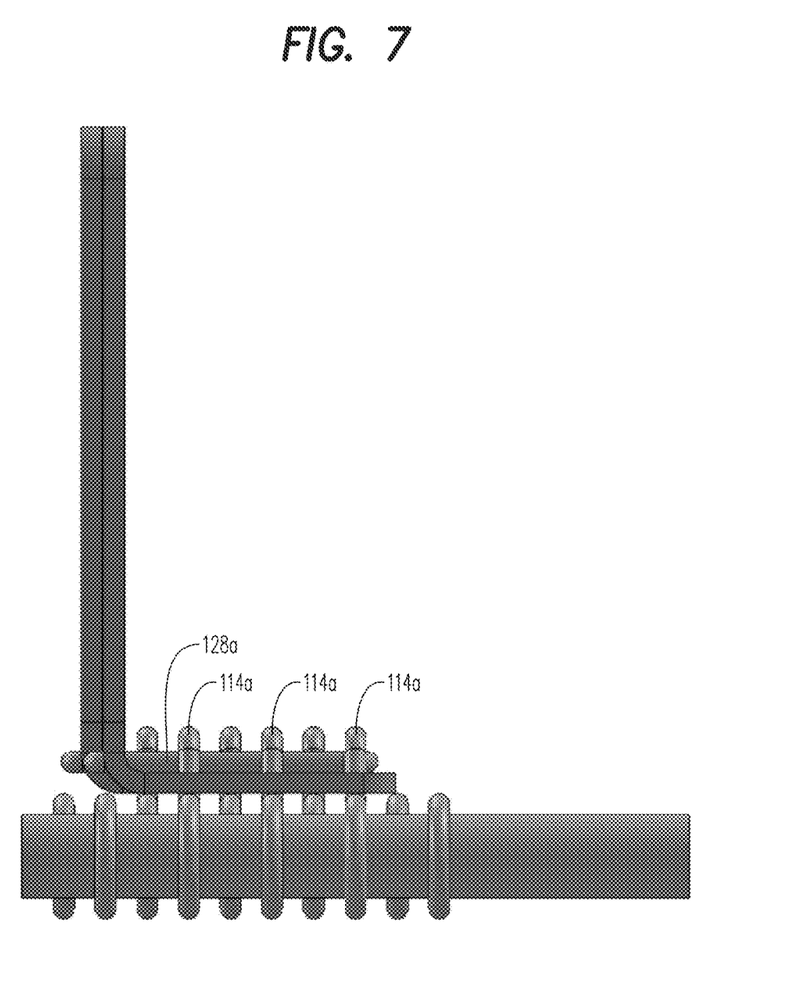
FIG. 7 is a side elevational view of the weldless side plate shown in FIG. 4.

The side plate 118 includes a bottom member 120 and an upstanding member 122 integrally formed therewith. In the illustrated embodiment, the upstanding member 122 has a trapezoidal shape which allows a right side of one member 122 to overlap with a left side of another adjacent member 122. This shape and the resulting overlap however is merely an exemplary embodiment and any shape could of course be used, and overlapping of the adjacent upstanding members is also not required.

Figure 8:
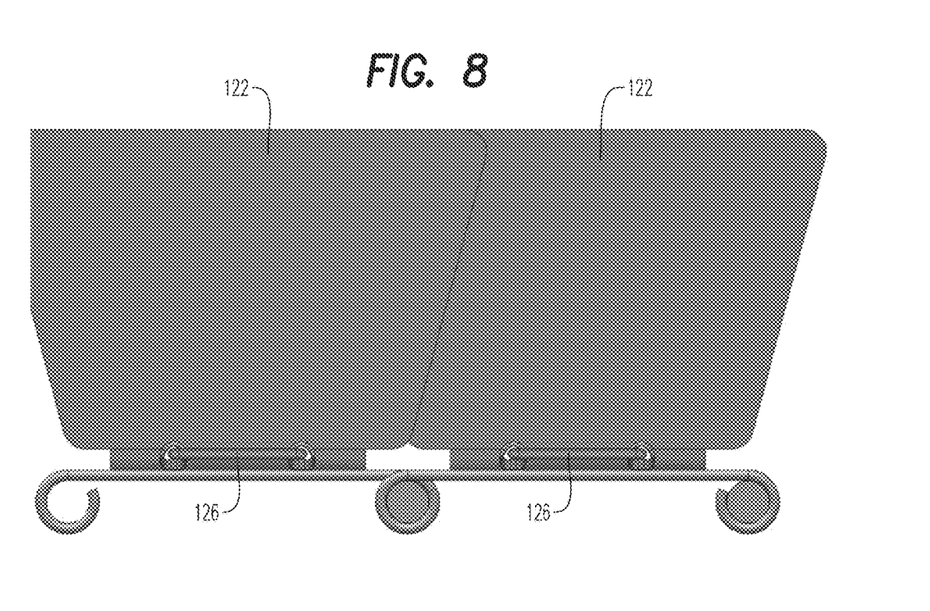
FIG. 8 is a rear elevational view of the adjacent weldless side plates shown in FIG. 3.

The side plates 118 further include a plurality of slots 132 formed in the bottom member 120 which allow the lane dividers 110 to extend the slot openings. A wire fastener 124 passes through the protrusions 114a, 114b extending above the bottom member 120 and thus secures the side plate 118 to the conveyor belt 100 without welding. More particularly, in an exemplary embodiment of the disclosure, the wire fastener 124 includes a base 126 which extends across the rear face of the upstanding member 122 of the side plate 118, and two legs 128a, 128b which pass through the protrusions 114a, 114b. The terminal ends of the legs 128a, 128b are curved about in the reverse direction to form curved ends 130a, 130b which prevent the legs from slipping out from the protrusions.

While the present invention has been described with respect to exemplary embodiments of the disclosure, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

The invention claimed is:

1. An eye link conveyor belt comprising:
a plurality of eyelets and a plurality of cross rods, said plurality of eyelets including openings on each end and said plurality of cross rods extending through the openings to thereby connect the plurality of eyelets together; and
a plurality of wire forms connected to the conveyor belt, the wire forms including at least two protrusions extending above a planar product support surface of the conveyor belt, wherein each of said plurality of wire forms includes a depression disposed between two of the at least two protrusions.

2. The eye link conveyor belt according to claim 1, wherein each of said plurality of wire forms includes openings on each end, said plurality of cross rods extending through the openings to thereby connect the plurality of wire forms to the conveyor belt.

3. The eye link conveyor belt according to claim 1, further comprising a plurality of cross wires, the plurality of eyelets being welded to the cross wires, and wherein said depression of each of said plurality of wire forms is welded to the cross wire.

4. The eye link conveyor belt according to claim 1, wherein said depression of each of said plurality of wire forms is concave as viewed from above the planar product support surface of the conveyor belt.

5. An eye link conveyor belt comprising:
a plurality of eyelets and a plurality of cross rods, said plurality of eyelets including openings on each end and said plurality of cross rods extending through the openings to thereby connect the plurality of eyelets together;
a plurality of wire forms connected to the conveyor belt, the wire forms including at least one protrusion extending above a planar product support surface of the conveyor belt; and
a plurality of side plates secured to the conveyor belt by the wire forms and extending above the planar product support surface of the conveyor belt.

6. The eye link conveyor belt according to claim 5, wherein each of said plurality of side plates includes a bottom member and an upstanding member.

7. The eye link conveyor according to claim 6, wherein each said side plate includes a plurality of slots formed in the bottom member which allows the wire forms to extend through the slots.

8. The eye link conveyor according to claim 7, further comprising a wire fastener configured to pass through the at least one protrusion extending above the bottom member, thereby securing the side plate to the conveyor belt in a weldless manner.

9. The eye link conveyor according to claim 8, wherein said at least one protrusion includes two protrusions, and wherein the wire fastener includes a base which extends across a rear face of the upstanding member of the side plate, and two legs which pass through the protrusions, a terminal end of each leg being curved about in a reverse direction to form a curved end which prevent the legs from slipping out from the protrusions.

10. A lane divider for use with an eye link conveyor belt comprising a plurality of eyelets and a plurality of cross rods, the plurality of eyelets including openings on each end and the plurality of cross rods extending through the openings to thereby connect the plurality of eyelets together, the lane divider comprising:
a plurality of wire forms connected to the conveyor belt, each of said plurality of wire forms including openings on each end, the plurality of cross rods extending through the openings to thereby connect the plurality of wire forms to the conveyor belt, the plurality of wire forms including at least one protrusion extending above a planar product support surface of the conveyor belt; and
a plurality of side plates secured to the conveyor belt by the wire forms and extending above the planar product support surface of the conveyor belt.

11. The lane divider according to claim 10, wherein each of said plurality of side plates includes a bottom member and an upstanding member.

12. The lane divider according to claim 11, wherein each said side plate includes a plurality of slots formed in the bottom member which allows the wire forms to extend through the slots.

13. The lane divider according to claim 12, further comprising a wire fastener configured to pass through the at least one protrusion extending above the bottom member, thereby securing the side plate to the conveyor belt.

* * * * *